United States Patent [19]

Morankar et al.

[11] Patent Number: 4,838,639

[45] Date of Patent: Jun. 13, 1989

[54] METHOD AND APPARATUS FOR ORIENTING A FIBER OPTIC MEMBER

[75] Inventors: Sudhakar D. Morankar, Glenview; Hermando Esguerra, Streamwood; Patrice Kerevel, Downers Grove; Michael J. Hilgart, Westmont, all of Ill.

[73] Assignee: Dukane Corporation, St. Charles, Ill.

[21] Appl. No.: 115,860

[22] Filed: Nov. 2, 1987

[51] Int. Cl.$^4$ .............................................. G02B 6/42
[52] U.S. Cl. ........................... 350/96.20; 219/121.63; 357/74
[58] Field of Search ............... 350/96.20, 96.21, 96.22; 250/227, 552; 357/17, 74, 85; 219/121 LC, 121 LD

[56] References Cited

U.S. PATENT DOCUMENTS

| | | | |
|---|---|---|---|
| 4,119,363 | 10/1978 | Camlibel et al. | 350/96.20 |
| 4,201,445 | 5/1980 | Kunze | 350/96.21 |
| 4,237,474 | 12/1980 | Ladany | 357/81 |
| 4,239,333 | 12/1980 | Dakss et al. | 350/96.21 |
| 4,296,998 | 10/1981 | Dufft | 350/96.20 |
| 4,357,072 | 11/1982 | Goodfellow et al. | 350/96.20 |
| 4,424,174 | 1/1984 | Howarth | 264/1.5 |
| 4,479,698 | 10/1984 | Landis et al. | 350/96.20 |
| 4,544,233 | 10/1985 | Iwamoto et al. | 350/96.20 |
| 4,547,039 | 10/1985 | Caron et al. | 350/96.20 |
| 4,615,031 | 9/1986 | Eales et al. | 372/36 |
| 4,678,271 | 7/1987 | Beaulieu | 350/96.20 |
| 4,702,556 | 10/1987 | Ishii et al. | 350/96.20 X |
| 4,714,315 | 12/1987 | Krause | 350/96.20 |

FOREIGN PATENT DOCUMENTS 58-76613  5/1983  Japan.
59-184313  10/1984  Japan.

Primary Examiner—John D. Lee
Attorney, Agent, or Firm—Allegretti & Witcoff, Ltd.

[57] ABSTRACT

A frame assembly for holding and orienting a fiber optic member is provided. The assembly comprises tubular means having a bore proportioned to slidingly receive a fiber optic member. The tubular means carries outwardly projecting flange means. U-shaped retainer means is proportioned to loosely receive the tubular means with the flange means being in essential contact with the retainer means. Accordingly, the fiber optic member may be moved with four degrees of freedom within the tubular means to occupy its desired position. Following this, it is affixed in that position by securing the fiber optic member to the tubular means and the flange means to the retainer means. Preferably, laser welding is used for each of the securing steps, since the system does not have to be touched or pushed in any way as the laser welding takes place.

25 Claims, 3 Drawing Sheets

METHOD AND APPARATUS FOR ORIENTING A FIBER OPTIC MEMBER

BACKGROUND OF THE INVENTION

The laser diode package is a known structure which is a basic element in the field of optic electronics. Basically, a light emitting diode or specifically a laser diode is held in precisely oriented relation with a fiber optic member. Accordingly, light emitted by the diode is carried by the fiber optic member, as part of an optical electronic circuit for use in optical electronic computers, microprocessors, communication systems, and the like.

The alignment of the fiber optic member with the light emitting diode is generally a very critical step in the manufacture of laser diode packages, or any other device which involves the orientation of a fiber optic member and an object with which it optically interacts. Attempts to solve this problem have been made in the past, for example see Eales et al. U.S. Pat. Nos. 4,615,031 and Goodfellow et al. 4,357,072 among others. However, each of the prior art attempts exhibit certain drawbacks and difficulties. For example, in some cases, adjustment of the fiber optic member is not possible with four degrees of freedom (namely translational movement in each of the three dimensions plus rotational movement as the fourth degree of movement). Additionally, in many prior art attempts to solve the problem, solder or adhesive is used to secure the fiber optic member in its desired position. The heat from the solder can cause distortions which can ultimately cause the fiber optic member to move slightly out of its optimum alignment. Also, the very process of contacting the fiber optic member with an adhesive is undesirable, and limits the accuracy of the process.

In accordance with this invention, a method and apparatus is provided for orienting fiber optic members with greater accuracy and ease. Additionally, the structure of this invention is simplified with respect to prior art structures, and of lower cost.

DESCRIPTION OF THE INVENTION

In accordance with this invention a frame assembly is provided for holding and orienting a fiber optic member. The frame assembly comprises tubular means having a bore proportioned to slidingly receive a fiber optic member, with the tubular means carrying outwardly projecting flange means. U-shaped retainer means are provided, being proportioned to loosely receive the tubular means with the flange means being in essential contact with the retainer means.

As a result of this, the fiber optic member may be moved with four degrees of freedom within the tubular means to occupy its desired position, and to then be affixed in that desired position by securing the fiber optic member to the tubular means and also securing the flange means to the retainer means. Preferably this securing action is accomplished by laser welding, which has the advantages of not requiring the use of adhesive, not requiring any physical touching of the tubular means or optic member after it has been adjusted, as a necessary part of affixing various parts together.

The tubular means may carry at least a pair of the projecting flange means which are in essential contact with the retainer means. Typically, the U-shaped retainer means also comprises at least a pair of coaxially positioned, spaced, U-shaped members against which the flange means are in essential contact.

In one embodiment, one of the flange means of the pair is respectively in essential contact with each of the U-shaped members of the pair described above, with the contact being at the surface of each member that is opposed to the surface of the other U-shaped member of the pair.

The tubular means may also carry two pairs of flange means, each of the pair of flange means being positioned in bracketing relationship with a U-shaped member of the pair of U-shaped members present.

In some embodiments, the tubular means may comprise a pair of adjacent, substantially coaxially positioned tubular members gripped and connected together by a rubber tube into which the tubular members project through opposed ends of the rubber tube in telescoping relation thereto. This greatly facilitates free movement of the tubular means along the U-shaped retainer means for adjustment, while at the same time the two members are biased toward each other so that they tend to retain the relative position into which they are placed.

The U-shaped retainer means is typically an integral part of a frame which carries a light emitting diode, generally a laser diode, in a position capable of alignment with the fiber optic member. The fiber optic member may be adjusted in any of four degrees of freedom by transverse sliding either vertically or horizontally by the retained tubular means in the U-shaped retainer means for two degrees of freedom, by advancement or retraction of the fiber optic member in the tubular means for a third degree of freedom, and by rotation of the fiber optic member for a fourth degree of freedom. When the fiber optic member and tubular means have been positioned in the desired optimum manner with respect to the light emitting diode, the tubular means may then be affixed to the fiber optic member and the flange means may be affixed to the retainer means, in each case preferably by laser welding so that the fiber optic member is permanently retained in the desired position.

Alternatively, the tubular means may comprise a pair of aligned, connected flanges. In this instance, the bore is defined by a pair of aligned apertures in the flanges, which technically are still tubular in nature, i.e. a pair of spaced tubes with the bores of the tubes and their lateral flanges being coextensive. Thus, the flanges through which the bores are defined may constitute the outwardly projecting flange means described above, and may function in a manner as described above, and as illustrated below. Typically, this particular structure of aligned, connected flanges may be connected by a web of material extending between ends of the two flanges, to provide a structure of U-shaped cross-section.

DESCRIPTION OF SPECIFIC EMBODIMENTS

Figure 1:
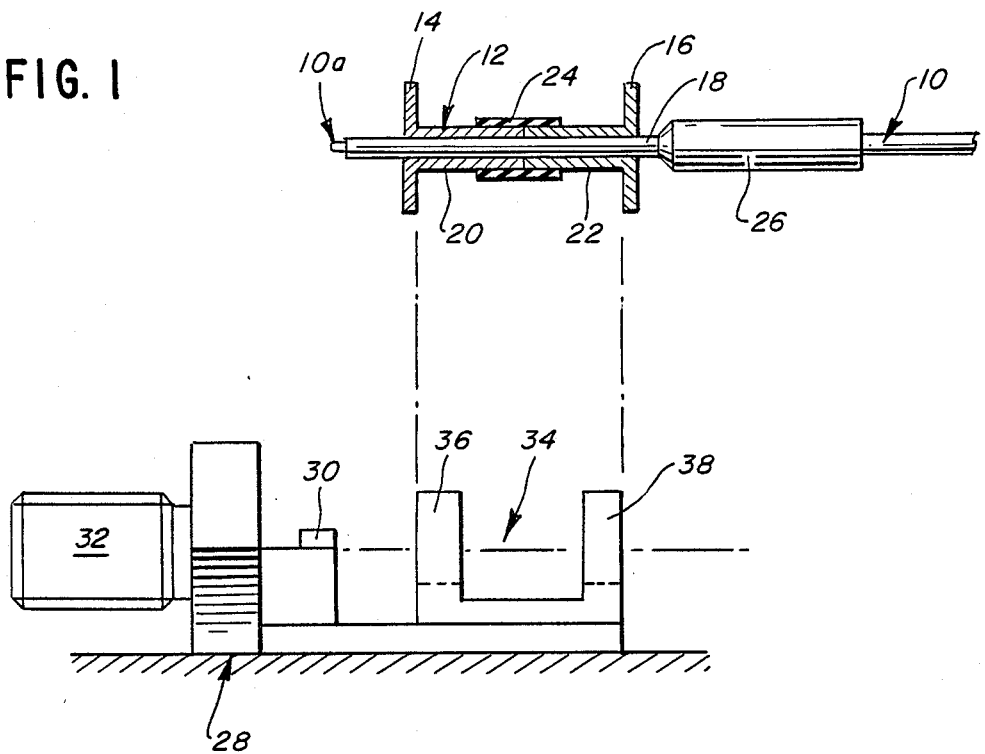
FIG. 1 is an elevational view of the tubular means holding a fiber optic member about to be inserted into the U-shaped retainer means, which is an integral part of a frame which carries a laser diode.

Referring to FIGS. 1 through 4, a frame assembly is disclosed for holding and orienting a fiber optic member 10 which may be any conventional design of fiber optic cable. Cable 10 may be stripped at end 10a if desired.

Tubular means 12 is provided, having a pair of outwardly projecting flanges 14, 16, and also telescopically carrying metal tube 18 through which fiber optic member 0 may extend as shown. Tubular means 12 may comprise a pair of abutting, tubular members 20, 22 positioned together in substantially coaxial relation as shown, and retained in that relationship by gripping rubber tube 24, into which tubular members 20, 22, project through the opposed ends of rubber tube 24 in telescoping relation thereto.

Fiber optic member 10 is affixed within metal tube 18, with metal tube 18 and the fiber optic member 10 being axially slidable and rotatable within tubular means 12 to advance and retract fiber optic member 10 relative to tubular means 12, as well as to provide rotational capability. Enlarged portion 26 of metal tube 18 provides a convenient gripping member for the system, with enlarged portion 26 typically having an enlarged bore to receive an unstripped portion of fiber optic member 10. Gripping of this thicker, stronger part 26 is desirable since the entire system can be exceedingly small. For example, the distance between flanges 14, 16 may be no more than one half inch, with the remaining dimensions of the structure correlating therewith.

Frame 28 carries a laser diode chip 30 for light emission which is of conventional design, being connected in conventional manner through frame 28 to diode base 32, which also may be of conventional design. In accordance with this invention, frame 28 carries U-shaped retainer means 34. In the particular embodiment of FIGS. through 4, a pair of coaxially positioned, spaced, U-shaped members 36, 38 are shown, with the individual U-shaped structure of member 38 being shown in FIG. 3, and the structure of member 36 being similar to it. Accordingly, aligned, U-shaped members 36, 38 provide a pair of slots 40 into which tubular means 12 can slide in retentive manner, as particularly indicated in FIG. 2.

Figure 2:
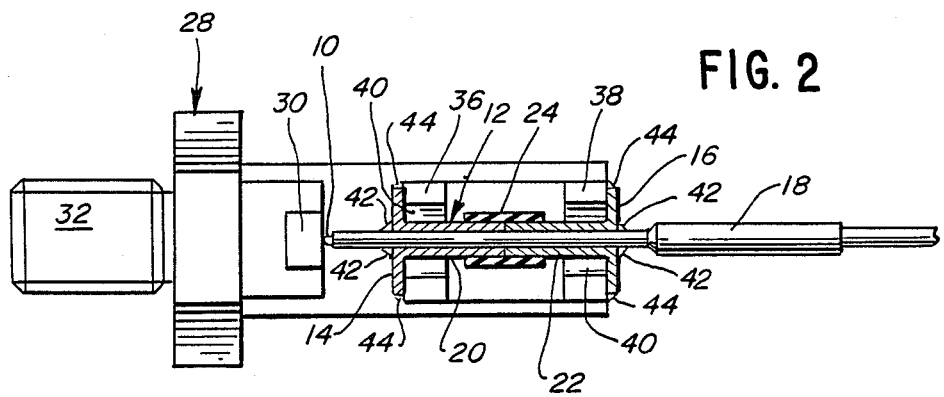
FIG. 2 is a plan view of the structure of FIG. 1 showing the tubular means in positioned, bonded relation with the U-shaped retainer means with some parts shown in section.
Figure 3:
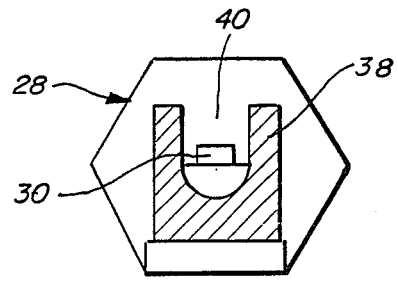
FIG. 3 is an end view of the U-shaped retainer means of FIGS. 1 and 2 with the tubular means and fiber optic member deleted.
Figure 4:
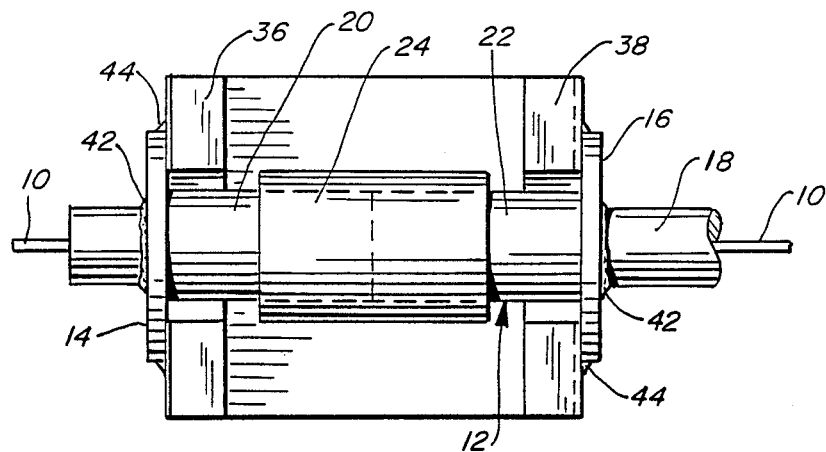
FIG. 4 is an enlarged plan view of a portion of FIG. 2.

It can be seen that the diameter of tubular members 20, 22 is substantially less than the width of the respective slots 40 (FIG. 2). Likewise, flanges 14, 16 are spaced so that they slide respectively into essential contact with each of U-shaped members 36, 38 at the surface of each member that is opposed to the surface of the other member of the pair as also shown in FIG. 2. Rubber tube 24, which is preferably present, provides a desired resilience so that flanges 14, 16, may grip U-shaped members 36, 38 in a retentive but slidable manner so that tubular means 12 is self supporting in its position on U-shaped members 36, 38 and can hold whatever sliding position into which it has been placed.

Thus, one may precisely adjust the position of fiber optic member 10 with respect to laser diode 30 until light emitted from diode 30 is received and transmitted in optimum manner through fiber optic member 10. One may use any conventional mechanical gripping and moving device if desired to make this alignment of fiber optic member 10 and tubular means 12 with laser diode 30, while the fiber optic member 10 and tubular means 12 are retained in position by the gripping action of flanges 14, 16 against U-shaped members 36, 38. In the adjustment process, tubular means 12 and fiber optic member 10 may move with four degrees of freedom as can be seen: they may move sideways because of the enlarged size of channels 40; they may move up and down because of the depth of channels 40 as shown; fiber optic member 10 may be axially advanced or retracted in tubular means 12; and fiber optic member 10 may be rotated with respect to tubular means 12. As a result of this, adjustment and orientation of fiber optic member 10 to laser diode 30 may be obtained with great facility.

After fiber optic member 10 has been oriented with respect to laser diode 30, being retained there by the retentive action of the system of this invention, one may laser weld fiber optic member 10 through its attached metal tube 18 to the tubular means 12 at a plurality of laser weld points or an annular laser weld 42. Also, flanges 14, 16 may be laser welded at a plurality of weld points or an annular area 44 to the respective U-shaped members 36, 38. Lasers capable for accomplishing such a purpose are well-known, one such laser being sold by Lumonics of Detroit, Mich. as a Model No. JK702Nd: YAG Industrial Laser with Multi-Flex Beam Delivery System. Metal tube 18, tubular members 20, 22 and their respective flanges 14 16, and U-shaped members 36, 38 are preferably made of stainless steel, or any other metal suitable for laser welding.

Thus, by this invention fiber optic member 10 may be easily placed into precise alignment with light emitting diode 30. After the desired alignment has been verified, laser welding may take place to secure fiber optic member 10 into such alignment, with the advantage that the chances of knocking fiber optic member 10 out of alignment during the welding process is greatly reduced by the use of laser welding since there is no physical touching of the components required in the laser welding process.

Thus, the desired, very precise orientations between fiber optic member 10 and laser diode chip 30 may be obtained and retained in a simple, inexpensive, and permanent manner by this invention. The resulting welded subassembly may then be installed for use in an optic microprocessor, a computer, communication system, or the like.

Figure 5:
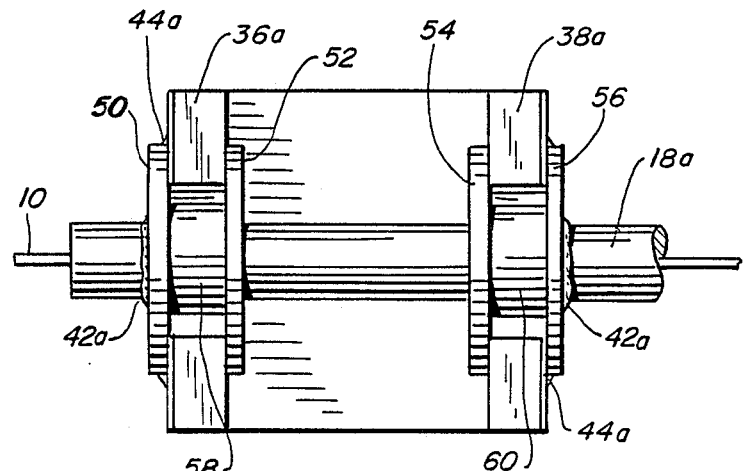
FIG. 5 is an enlarged plan view similar to FIG. 4 of an alternative embodiment of this invention.

Referring now to FIG. 5, a modified embodiment of the invention of this application is shown, this embodiment being similar to the previous embodiment except as described below.

In this embodiment, the tubular means carries two pairs of flange means 50, 52, 54, 56, each pair of flange means being carried on a separate tubular member 58, 60. A pair of U-shaped members 36a, 38a are provided, being similar to U-shaped members 36, 38 of the previous embodiment. Metal tube 18a, similar to the previously described metal tube 18, carries fiber optic member 10, as before.

In this embodiment, one of the pairs of flange means 50, 52 is positioned in bracketing, retaining relation with U-shaped member 36a. The other of the pair of flange means 54, 56 are in bracketing, retaining relation with U-shaped member 38a. Accordingly, fiber optic member 10 and its attached metal tube 18a may move with four degrees of freedom in their retentive relation with U-shaped members 58, 60, in a manner similar to the previous embodiment.

After the fiber optic member 10 has been precisely positioned in the desired manner, laser welds along annular areas 42a, 44a provide securance in a manner similar to the previous embodiment.

Figure 6:
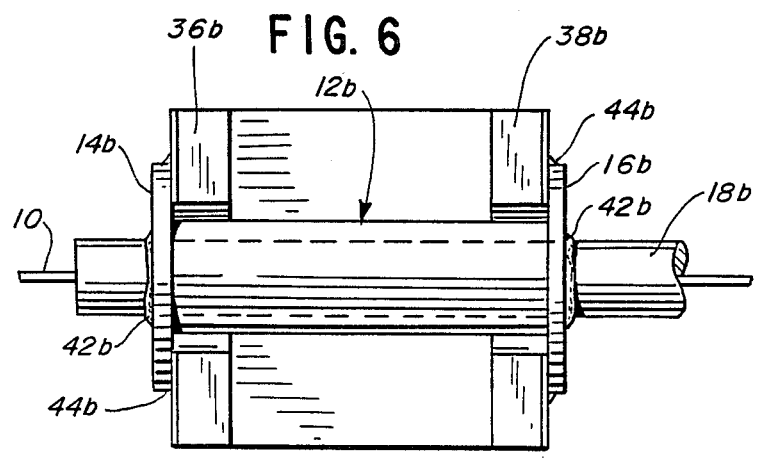
FIG. 6 is an enlarged plan view similar to FIG. 4 of a further alternative embodiment of this invention.

Turning now to FIG. 6, this structure utilizes a single, integral tubular means 12b having a pair of flanges 14b, 16b, which are similar to the prior flanges 14, 16 in their function. This single, rigid structure may be used to be retained in U-shaped retainer means 36b, 38b, similar to previous embodiments, for the proper positional adjustment of fiber optic member 10, the end of which is carried in metal tube 18b as before. When the positioning has been achieved, laser welding along annular areas 42b, 44b takes place as before.

Flanges 14b, 16b may be thin enough to exhibit a certain springing action so as to provide the desired movable retention to the system. As a further alternative, flanges 14b, 16b may be positioned to be placed inside of U-shaped members 36b, 38b to accomplish a similar purpose.

Referring now to FIGS. 7 through 11, another embodiment of the invention of this application is disclosed, being usable with frame 28, laser diode chip 30, and the other structures as shown in FIG. 1.

Figure 7:
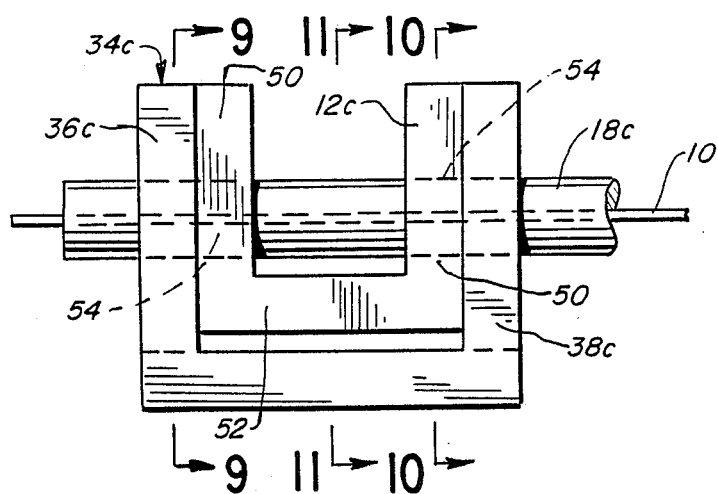
FIG. 7 is an elevational view of another embodiment of fiber optic member holding means in accordance with this invention, with other parts of the apparatus deleted.
Figure 9:
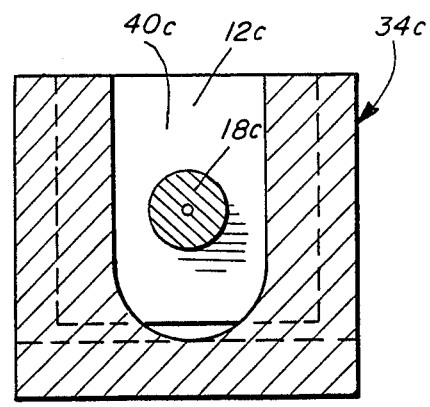
FIGS. 9, 10 and 11 are sectional views taken along their respectively numbered section lines as shown in FIG. 7.
Figure 10:
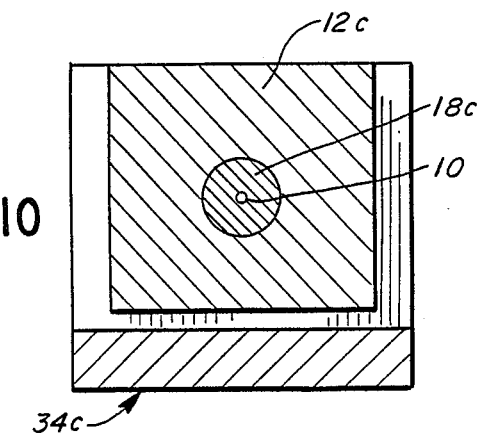

Fiber optic member 10, as before, resides in metal tube 18c, which is analogous to the corresponding tube of the previous embodiments. However, in this embodiment, tubular means 12c is a U-shaped structure (as seen in FIG. 7) comprising a pair of aligned flanges 50, connected together by web 52. Flanges 50 each define an aperture 54, through which metal tube 18c snugly extends, being slidingly, axially movable therein.

Member 12c, in turn, fits snugly within U-shaped retainer means 34c. Each U-shaped retainer plate 36c, 38c defines a slot 40c, and is of a design which may be similar to the corresponding structures of the previous embodiments.

Figure 8:
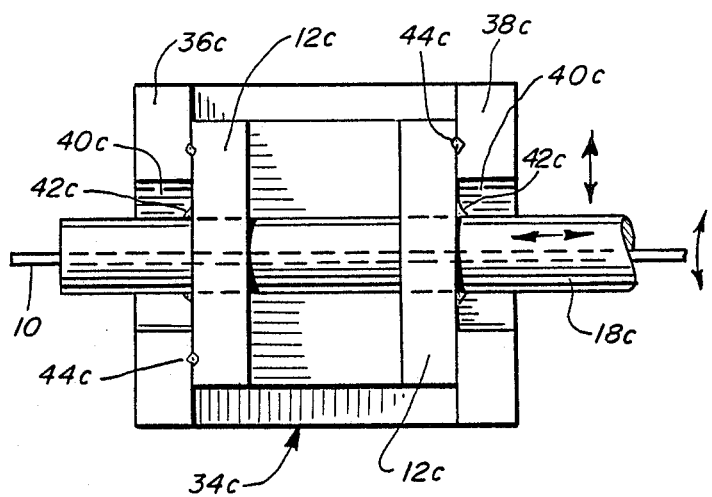
FIG. 8 is a plan view of the structure of FIG. 7.
Figure 11:
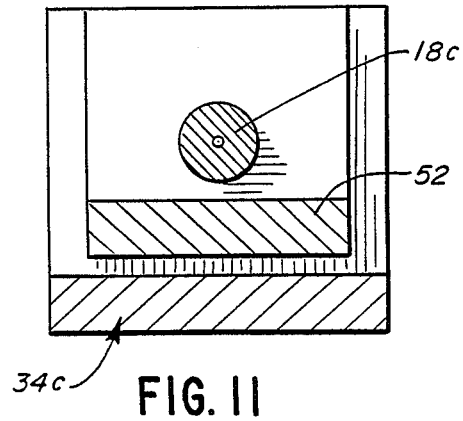

As shown in the drawings, tubular means 12c fits in sliding, frictionally retentive relation as shown in FIG. 7 within the individual U-shaped members 36c, 38c for retention of tubular means 12c in the desired position. It can be seen that cable 10 and tube 18c can be moved with the same four degrees of freedom as in previous embodiments. As shown in FIG. 8, when the proper position of cable 10 has been achieved, the formation of welds 42c, 44c may proceed as previously described, to affix cable 10 into its desired position with respect to laser diode chip 30.

The above has been offered for illustrative purposes only, and is not intended to limit the scope of the invention of this application, which is as defined in the claims below.

That which is claimed is:

1. A frame assembly for holding and orienting a fiber optic member, which comprises:
tubular means having a bore proportioned to slidingly receive a fiber optic member, U-shaped retainer means proportioned to loosely receive and movably hold said tubular means whereby said fiber optic member may be moved with four degrees of freedom while within said tubular means to occupy its desired position, to then be affixed there by securing the fiber optic member to the tubular means and the tubular means to the retainer means, said tubular means comprising a pair of aligned flanges connected together by a web at respective ends thereof, said bore being defined by a pair of aligned apertures in said flanges, with said fiber optic member projecting through said bore.

2. A frame assembly for holding and orienting a fiber optic member, which comprises: tubular means having a bore proportioned to slidingly receive a fiber optic member, said tubular means carrying at least a pair of spaced, outwardly projecting flange means; U-shaped retainer means proportioned to loosely receive said tubular means with the flange means being in essential contact with said retainer means to prevent relative longitudinal motion between said tubular means and retainer means, whereby said fiber optic member may be moved with four degrees of freedom while within said tubular means to occupy its desired position, to then be affixed there by securing the fiber optic member to the tubular means and the flange means to the retainer means.

3. The frame assembly of claim 2 in which said U-shaped retainer means comprises at least a pair of coaxially positioned, spaced, U-shaped members against which said flange means are in essential contact.

4. The frame assembly of claim 3 in which one of said flange means of said pair is respectively in essential contact with one of said U-shaped members at the surface of each member that is opposed to the surface of the other member of the pair.

5. The frame assembly of claim 3 in which said tubular means carries two pairs of flange means, each of said pair of flange means being positioned in bracketing relationship with a U-shaped member.

6. The frame assembly of claim 3 in which said tubular means comprises a pair of abutting, substantially coaxial tubular members gripped and connected together by a rubber tube into which said tubular members project through opposed ends of said rubber tube in telescoping relation thereto.

7. The frame assembly of claim 1 in which said U-shaped retainer means is an integral part of a frame which carries a light emitting diode in a position capable of alignment with said fiber optic member.

8. The frame assembly of claim 7 in which said light emitting diode is a laser diode.

9. The frame assembly of claim 2 in which the flange means is secured to the retainer means by a laser weld.

10. The frame assembly of claim 9 in which the fiber optic member is secured to the tubular means by a laser weld.

11. The frame assembly of claim 2 in which said tubular means comprises a pair of aligned, connected flanges, said bore being defined by a pair of aligned apertures in said flanges, said flanges constituting said outwardly projecting flange means.

12. A frame assembly for holding and orienting a fiber optic member, which comprises: tubular means having a bore positioned to slidingly receive a fiber optic member, said tubular means carrying at least a pair of spaced, outwardly projecting flange means; U-shaped retainer means proportioned to loosely receive said tubular means with the flange means being in essential contact with said retainer means, to prevent relative longitudinal motion between said tubular means and retainer means, said tubular means comprising a pair of abutting, substantially coaxial tubular members, gripped and connected together by a rubber tube into which said tubular members project through opposed ends of the rubber tube in telescoping relation thereto, each tubular member carrying a flange, whereby said fiber optic member may be moved with four degrees of freedom while within said tubular means to occupy its desired position, to then be affixed there by securing the fiber optic member to the tubular means and the flange means to the retainer means.

13. The frame assembly of claim 12 in which said U-shaped retainer means is an integral part of a frame which carries a light emitting diode in a position capable of alignment with said fiber optic member.

14. A laser diode package which comprises a frame which carries a light emitting diode, a frame assembly as an integral part of said frame which comprises a U-shaped retainer means; tubular means having a bore proportioned to slidingly receive a fiber optic member, said tubular means carrying outwardly projecting flange means, said U-shaped retainer means being proportioned to loosely receive said tubular means with the flange means being in essential contact with said retainer means to prevent relative longitudinal motion between said tubular means and retainer means, said tubular means carrying at least a pair of said projecting flange means which are in essential contact with said retainer means, whereby said fiber optic member may be moved with four degrees of freedom while within said tubular means to occupy its desired position, to then be affixed there by securing the fiber optic member to the tubular means and the flange means to the retainer means.

15. The laser diode package of claim 14 in which the flange means is secured to the retainer means by a laser weld.

16. The laser diode package of claim 15 in which the fiber optic member is secured to the tubular means by a laser weld.

17. The laser diode package of claim 16 in which said U-shaped retainer means comprises at least a pair of coaxially positioned, spaced, U-shaped members against which said flange means are in essential contact.

18. The package of claim 17 in which one of said flange means of said pair is respectively in essential contact with each of said U-shaped members at the surface of each member that is opposed to the surface of the other member of the pair.

19. The package of claim 17 in which said tubular means carries two pairs of flange means, each of said pair of flange means being positioned in bracketing relationship with a U-shaped member.

20. The package of claim 17 in which said tubular means comprises a pair of abutting, substantially coaxial tubular members gripped and connected together by a rubber tube into which said tubular members project through opposed ends of said rubber tube in telescoping relation thereto.

21. The package of claim 14 in which said tubular means comprises a pair of aligned, connected flanges, said bore being defined by a pair of aligned apertures in said flanges, said flanges constituting said outwardly projecting flange means.

22. The method of permanently aligning a fiber optic member with a light emitting diode to permit optimum light transmission from the diode through the fiber optic member, which comprises: inserting said fiber optic member into the bore of tubular means, said bore being proportioned to slidingly receive said fiber optic member; seating said tubular means in a U-shaped retainer means proportioned to loosely receive said tubular means with outwardly projecting flange means of said tubular means being in essential contact with said retainer means to prevent relative longitudinal motion between said tubular means and retainer means; adjusting the position of said fiber optic member as necessary through up to four degrees of freedom provided by the loose fittings of said tubular means in the U-shaped retainer means and by the permitted axial and rotational motion of the fiber optic member in the tubular means until said fiber optic member is properly oriented with respect to a light emitting diode carried in a fixed position relative to said U-shaped retainer means; and thereafter adhering said fiber optic member into fixed position with said tubular means, and adhering the tubular means into fixed position with said U-shaped retainer means.

23. The method of claim 22 in which said tubular means is adhered to said U-shaped retainer means by laser welding the outwardly projecting flange means to said U-shaped retainer means.

24. The method of claim 23 in which said fiber optic member is adhered to the tubular means by laser welding.

25. The method of claim 22 in which said fiber optic member is adhered to the tubular means by laser welding.

* * * * *